United States Patent
T et al.

(10) Patent No.: US 8,396,201 B1
(45) Date of Patent: Mar. 12, 2013

(54) ASYNCHRONOUS CALLS USING INTERMITTENT CALLBACK FOR DELAY SENSITIVE APPLICATIONS

(75) Inventors: Timothy Noel T, Bangalore (IN); Srinivasa Ds, Mysore (IN); Siddharth Tuli, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 743 days.

(21) Appl. No.: 12/603,637

(22) Filed: Oct. 22, 2009

(51) Int. Cl.
*H04M 3/42* (2006.01)

(52) U.S. Cl. ......... 379/210.01; 379/207.02; 379/207.03; 379/209.01

(58) Field of Classification Search ............. 379/210.01, 379/209.01, 201.01, 211.01, 207.03, 207.02; 370/232
See application file for complete search history.

(56) References Cited

U.S. PATENT DOCUMENTS

| | | | | |
|---|---|---|---|---|
| 5,909,487 | A * | 6/1999 | Mainker | 379/209.01 |
| 6,810,523 | B2 | 10/2004 | Segev et al. | |
| 6,977,893 | B1 * | 12/2005 | Lund | 370/232 |
| 2008/0270812 | A1 | 10/2008 | Sangili et al. | |

OTHER PUBLICATIONS

Jones, M. Tim; "Boost application performance using asynchronous I/O," IBM, Aug. 29, 2006, pp. 1-15.
"The Realtime Extension" *A White Paper from the X/Open Base Working Group*. Version 1 Last updated Mar. 12, 1997, hhttp://www.unix.org/version2/whatsnew/realtime.html, pp. 1-3.

* cited by examiner

*Primary Examiner* — Thjuan K Addy
(74) *Attorney, Agent, or Firm* — Harrity & Harrity, LLP (57) ABSTRACT

A call handling system receives an asynchronous call request, from a call requester, requesting performance of an operation, where the call request includes a delay parameter specified by the call requester. The call handling system performs the requested operation, and sends a callback to the call requester, which includes partial results from performance of the requested operation, at selected intervals determined by the delay parameter.

20 Claims, 9 Drawing Sheets

ASYNCHRONOUS CALLS USING INTERMITTENT CALLBACK FOR DELAY SENSITIVE APPLICATIONS

BACKGROUND

Asynchronous call interfaces provided by operating systems allow user programs to register callbacks which get processed after the completion of an operation requested by an asynchronous call. When completion of the requested operation takes a considerable amount of time by the operating system, user programs experience delays that lead to poor end-user response and productivity. Since these delays in the operating system cannot be measured or predicted, user programs typically cannot overcome this bottleneck. Therefore, no mechanism currently exists for handling large asynchronous requests from the user in an efficient manner.

SUMMARY

In accordance with one embodiment, a method implemented by a call handling system may include receiving an asynchronous call request at the call handling system, from a call requester, requesting performance of an operation, where the call request includes a delay parameter specified by the call requester. The method may further include performing, by the call handling system, the requested operation. The method may also include sending a callback, from the call handling system to the call requester, which includes partial results from performance of the requested operation, at selected intervals determined by the delay parameter.

In another implementation, a call handling system may include a timer; and a call handling unit to: receive an asynchronous call request, from a call requester, requesting performance of an operation, where the call request includes a delay parameter specified by the call requester, perform the requested operation, obtain timing information from the timer, determine, based on the timing information, expiration of a first interval that corresponds to the delay parameter, send a first callback to the call requester, which includes a first partial result from performance of the requested operation, in response to expiration of the first interval, determine, based on the timing information, the expiration of a second interval that corresponds to the delay parameter, and send a second callback to the call requester, which includes a second partial result from performance of the requested operation, in response to expiration of the second interval.

In still another implementation, a call handling system may include means for receiving an asynchronous call request, from a call requester, requesting performance of an operation, where the call request includes a delay parameter, specified by the call requester, that defines the call requester's tolerance for delay in performance of the requested operation. The call handling system may further include means for performing the requested operation, and means for sending a callback to the call requester, which includes partial results from performance of the requested operation, at selected intervals determined by the delay parameter until entire results for the requested operation are sent to the call requester.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Exemplary embodiments described herein enable the handling of asynchronous calls using intermittent callbacks for delay sensitive call requesters. In accordance with exemplary embodiments, the asynchronous call issued by a call requester, that requests an operation be performed by a call handling system, may include a specified delay parameter that indicates the call requester's tolerance for delay in receiving results from the performed operation. This specified delay parameter may then be used to set an interval for an intermittent callback to the call requester from the call handling system. During the intermittent callback, the call handling system may return any complete results that have resulted from performance of the requested operation at that point in time, or any partial results that have resulted from performance of the requested operation at that point in time. Thus, at each intermittent callback, as determined by the specified delay parameter, the call handling system may return a partial or complete result which results from performance of the requested operation to the call requester. Intermittent callback, as described herein, has particular applicability when the operation requested by the call requester may take a lengthy period of time (i.e., relative to the call requester's delay tolerance). In some embodiments, the call requester may modify the specified delay parameter during intermittent callbacks prior to the final partial results being returned to the call requester, thus, changing a length of the callback interval.

Exemplary Environment

Figure 1:
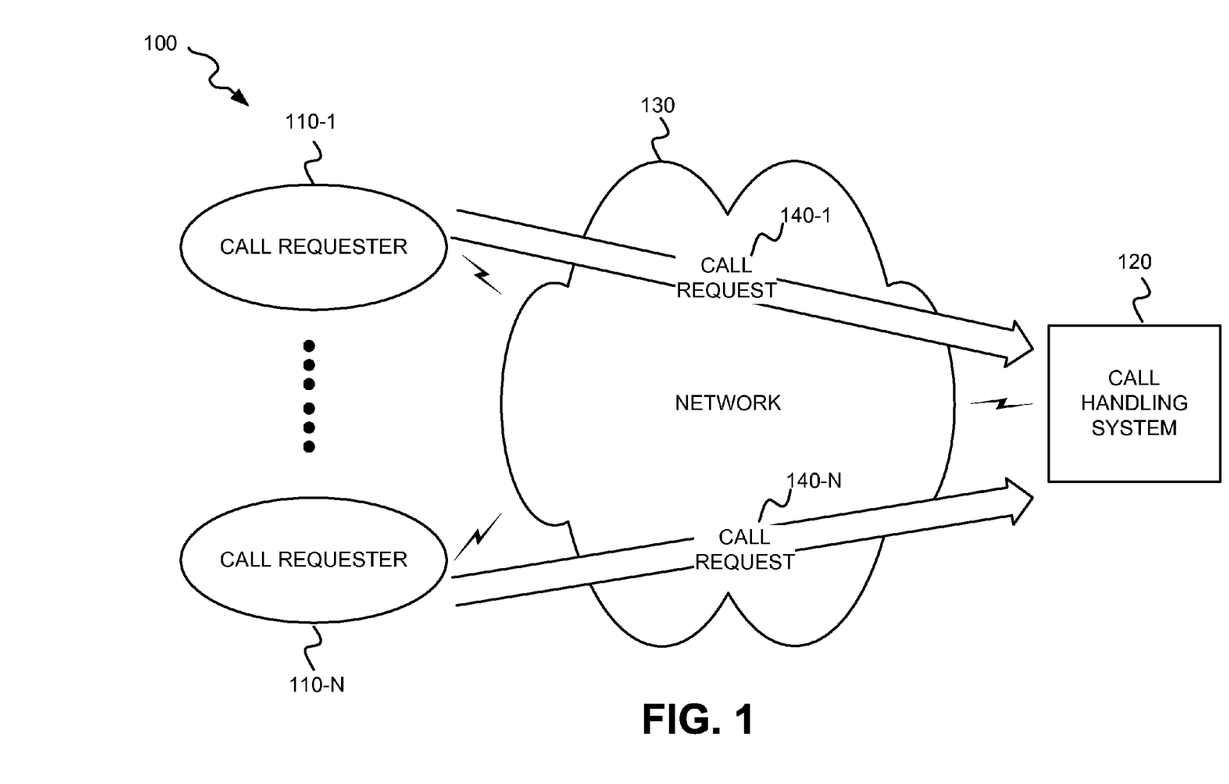
FIG. 1 is a diagram of an exemplary environment in which call requesters may send call requests to a call handling system.

FIG. 1 is a diagram of an exemplary environment 100 in which one or more call requesters may send call requests to a call handling system. As shown, environment 100 may include multiple call requesters 110-1 through 110-N, a call handling system 120 and a network 130. Call requesters 110-1 through 110-N may send respective asynchronous call requests 140-1 through 140-N via network 130.

Each of call requesters 110-1 through 110-N may include an entity that may request the performance of an operation by call handling system 120 via respective call requests 140-1 through 140-N. As described further below, each of call requests 140-1 through 140-N may include a specified delay parameter that indicates the call requester's tolerance for delay in receiving results from the performed operation. The specified delay parameter, as also described below, may be used for determining an intermittent callback interval for call handling system 120 to provide partial results that result from the operation back to the requesting call requester. Call requesters 110-1 through 110-N may include, for example, any type of entity that requests the performance of an operation by another entity, and the return of the results of that requested operation back to the call requesters. Each of call requesters 110-1 through 110-N may include, for example, an application that requests the performance of an operation by its operating system.

Call handling system 120 may include any type of entity that processes call requests from call requesting entities (e.g., call requesters 110-1 through 110-N), processes those call requests to determine the operation being requested by the call requesting entities, and performs the requested operation to obtain results that are returned to the call requesting entities via one or more callbacks. As described herein, call handling system 120 may return partial results of a requested operation via intermittent callbacks, the intervals of which may be determined by a specified delay parameter supplied by the call requesting entity.

Network 130 may include one or more networks of any type, including a local area network (LAN); a wide area network (WAN); a metropolitan area network (MAN); a telephone network such as a Public Switched Telephone Network (PSTN) or a Public Land Mobile Network (PLMN); a satellite network; an intranet; the Internet; or a combination of networks. The PLMN may further include a packet-switched network, such as, for example, a General Packet Radio Service (GPRS) network, a Cellular Digital Packet Data (CDPD) network, or a Mobile IP network. In one embodiment, network 130 may include a system bus within a single device (e.g., a system bus within a computer system), or a physical or logical interface within a single device.

Each of call requests 140-1 through 140-N may include an identification of the operation to be performed, and, possibly, a number of units requested to be returned as a result of the performed operation. The number of units requested may be dependent on the operation that is requested to be performed. For example, the number of units requested may be specified in a number of bytes requested, a number of discrete data parameters requested (e.g., discrete statistics related to a certain process), etc. Each of call requests 140-1 through 140-N may further include a specified delay parameter, and a callback routine identifier. As described above, the specified delay parameter may indicate the call requester's tolerance for delay in receiving results from the performed operation, and may be used to determine an intermittent callback interval for call handling system 120 to provide partial results that result from the operation back to the requesting call requester.

The number of call requesters and/or call handling systems depicted in FIG. 1 is exemplary. Fewer, or more, call requesters and/or call handling systems than those shown may be included in environment 100.

Figure 2:
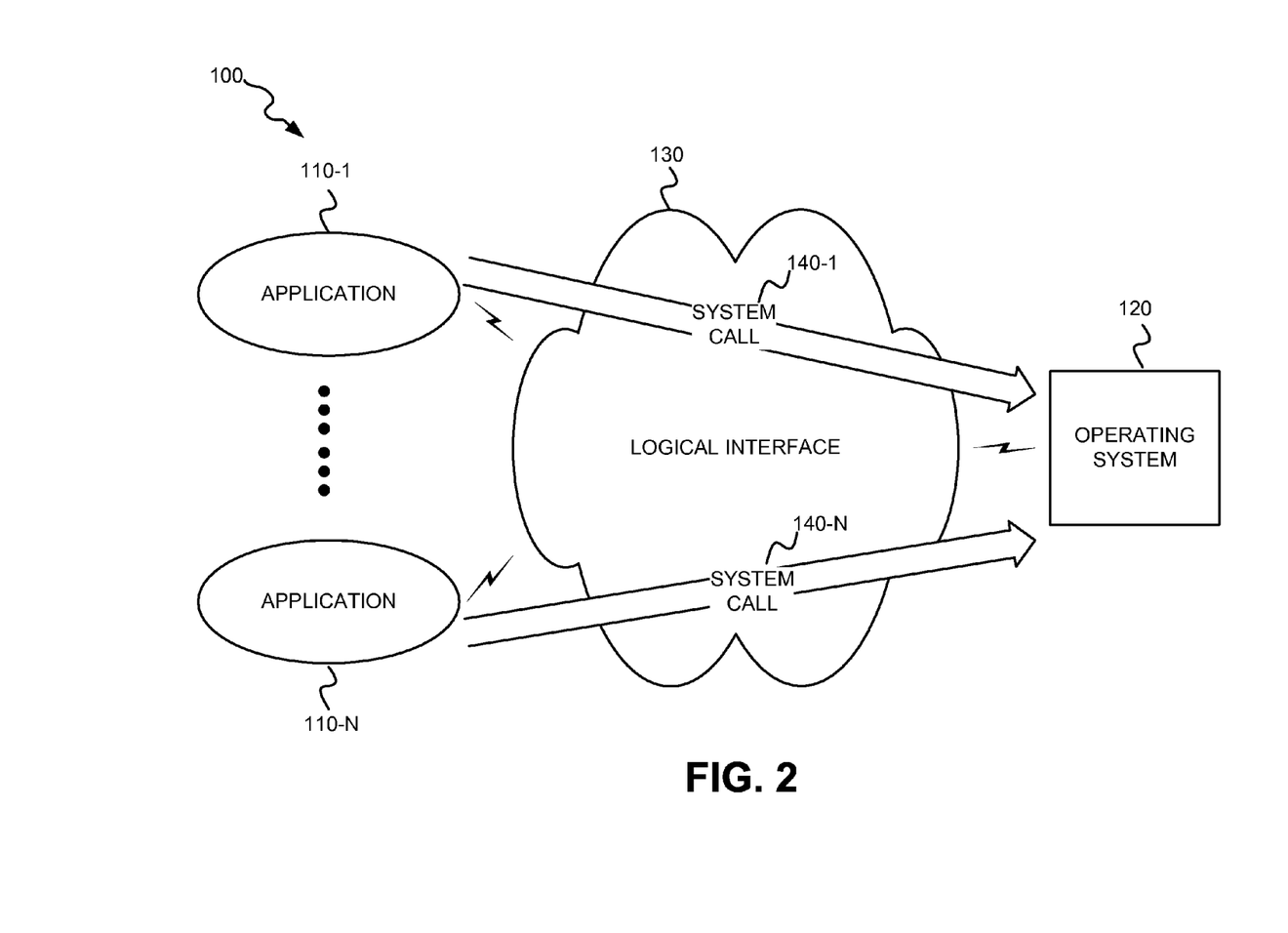
FIG. 2 is a diagram of an example of the environment of FIG. 1 where the call requestors include applications and the call handling system includes an operating system.

FIG. 2 is a diagram of an example of environment 100 of FIG. 1. As shown in the example of FIG. 2, call requesters 110-1 through 110-N may include applications, and call handling system 120 may include an operating system 120 (e.g., a Kernel). Applications 110-1 through 110-N may send respective system calls 140-1 through 140-N to operating system 120 via logical interface 130. Applications 110-1 through 110-N may include any type of software/hardware application that may request the performance of a certain operation (e.g., a system call) from operating system 120. System calls 140-1 through 140-N may request services (i.e., performance of certain operations) from operating system 120.

FIG. 2 depicts merely one example of the types of call requesters 110 and call handling system 120 that may be present in environment 100. Other types of call requesters 110 and call handling systems 120 may, alternatively, be present. For example, in one exemplary embodiment, call requester 110 may include a daemon and call handling system 120 may include a packet forwarding engine (PFE), and the daemon may request packet forwarding statistics from the PFE.

Exemplary Device

Figure 3:
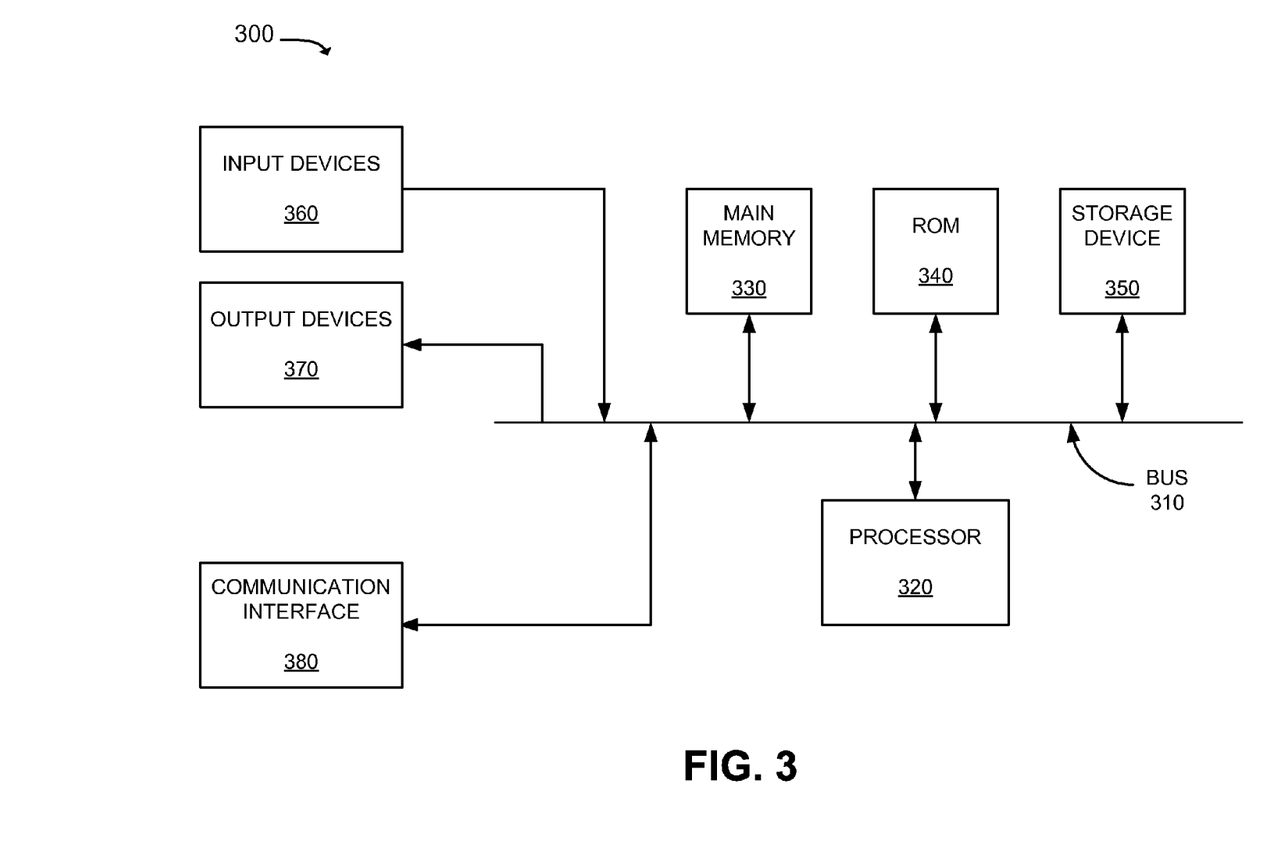
FIG. 3 is a diagram of components of an exemplary device in which the environment of FIG. 1 may be implemented.

FIG. 3 is a diagram of components of a device 300 in which the exemplary environment of FIG. 1 or 2 may be implemented in accordance with one exemplary embodiment. Device 300 may include a bus 310, a processor 320, a main memory 330, a read only memory (ROM) 340, a storage device 350, input device(s) 360, output device(s) 370, and a communication interface 380. The exemplary device 300 of FIG. 3 may, in one exemplary embodiment, implement call requesters 110-1 through 110-N and/or call handling system 120. In such an embodiment, processor 320 may implement the operating system (i.e., call handling system 120) and may further implement call requesters 110-1 through 110-N as separate processes (e.g., as different, separate applications for each of call requesters 110-1 through 110-N). Call requests and callbacks may pass between the operating system and the different applications via a logical interface. In another exemplary embodiment, a different device 300 may implement each of call requesters 110-1 through 110-N and call handling system 120. In this exemplary embodiment, call requests and callbacks may pass between each of devices 300 implementing call requesters 110-1 through 110-N and call handling system 120 via network 130.

Bus 310 may include a path that permits communication among the components of device 300. Processor 320 may include, for example, a processor, microprocessor, and/or processing logic that may interpret and execute instructions. In some implementations, processor 320 may include multiple processors (e.g., parallel processors). Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device(s) 360 may include one or more mechanisms that permit an operator to input information to device 300, such as a keyboard, a mouse, a pen, voice recognition and/or biometric mechanisms, etc. Output device(s) 370 may include one or more mechanisms that output information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system.

Device 300 may perform certain operations or processes, as will be described in detail below. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices.

The software instructions may be read into memory 330 from another computer-readable medium, such as storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with embodiments described herein. Thus, exemplary implementations are not limited to any specific combination of hardware circuitry and software.

Exemplary Call Handling System

Figure 4:
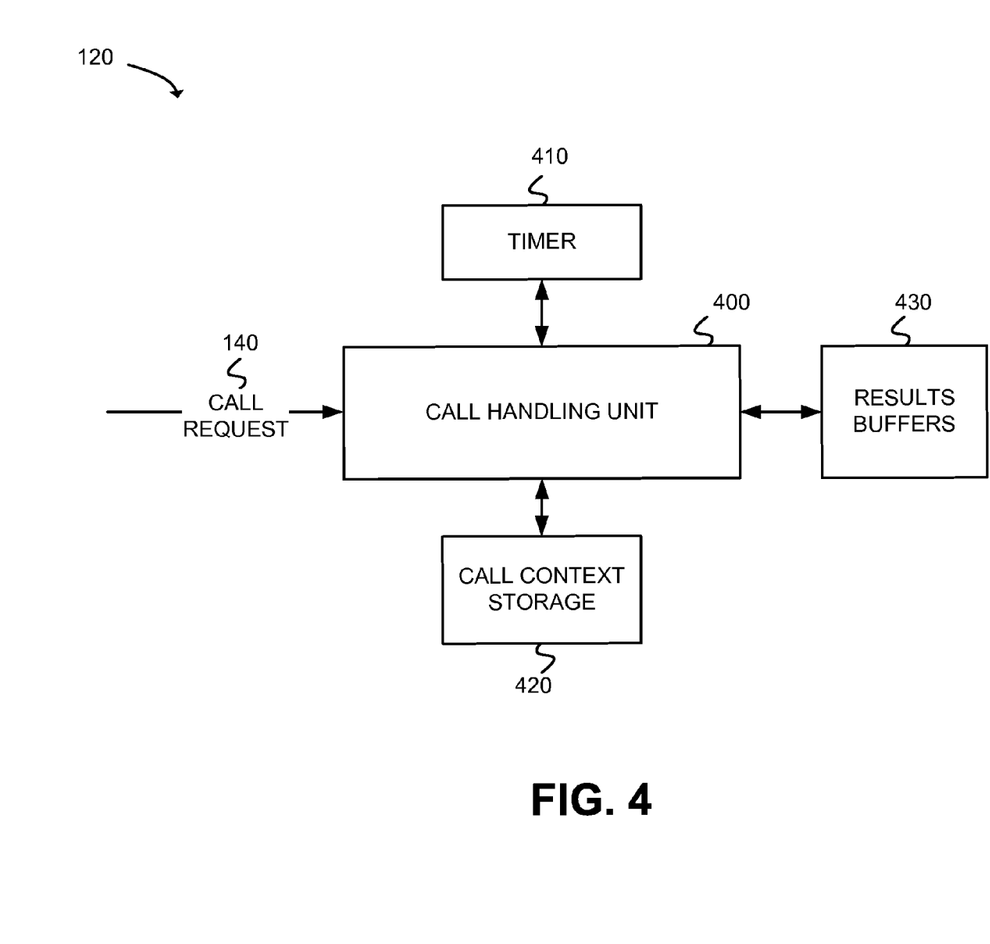
FIG. 4 is a functional diagram of the call handling system of FIG. 1.

FIG. 4 is a functional diagram of calling handling system 120 of FIG. 1. Calling handling system 120 may include a calling handling unit 400, a timer 410, a call context storage 420, and results buffers 430.

Call handling unit 400 may receive a call request(s) 140 from a respective one of call requesters 110-1 through 110-N. Upon receipt of the call request 140, call handling unit 400 may assign a session identifier to call request 140, and may retrieve the specified delay parameter, the callback routine identifier, the indication of the requested operation, and the number of units requested from call request 140. Call handling system 400 may store the assigned session ID, the specified delay parameter, callback routine identifier, requested operation, and the number of units requested as a call context within call context storage 420. Call handling unit 400 may then perform the operation requested in call request 140, or have another entity (not shown) perform the operation requested in call request 140, and may store the full results, or partial results to a results buffer of results buffers 430. Each of the partial results may be stored in a results buffer of results buffers 430 at an interval determined by delay parameter specified by call request 140.

Timer 410 may keep track of the passage of time, either in a relative sense (e.g., similar to a stopwatch) or in an absolute sense (e.g., the actual, current time). Timer 410 may provide timing information to call handling unit 400, either continuously or at periodic intervals (e.g., every 100 milliseconds).

Call context storage 420 may store one or more call contexts received from call handling unit 400. Each call context may include, for example, an assigned session ID, a specified delay parameter, a callback routine identifier, a requested operation and a number of units requested for each call request 140 received by call handling unit 400.

Results buffers 430 may include multiple results buffers, with one result buffer existing for each session identifier assigned by call handling unit 400. Each one of results buffers 430 may store complete or partial results returned as a result of the operation requested by a respective call request 140.

The functional components depicted in FIG. 4 are exemplary. Call handling system 120 may have more, fewer and/or different components than those shown in FIG. 4. Additionally, any one of the components shown in FIG. 4 may perform tasks described herein as being performed by another component.

Exemplary Call Context Storage

Figure 5:
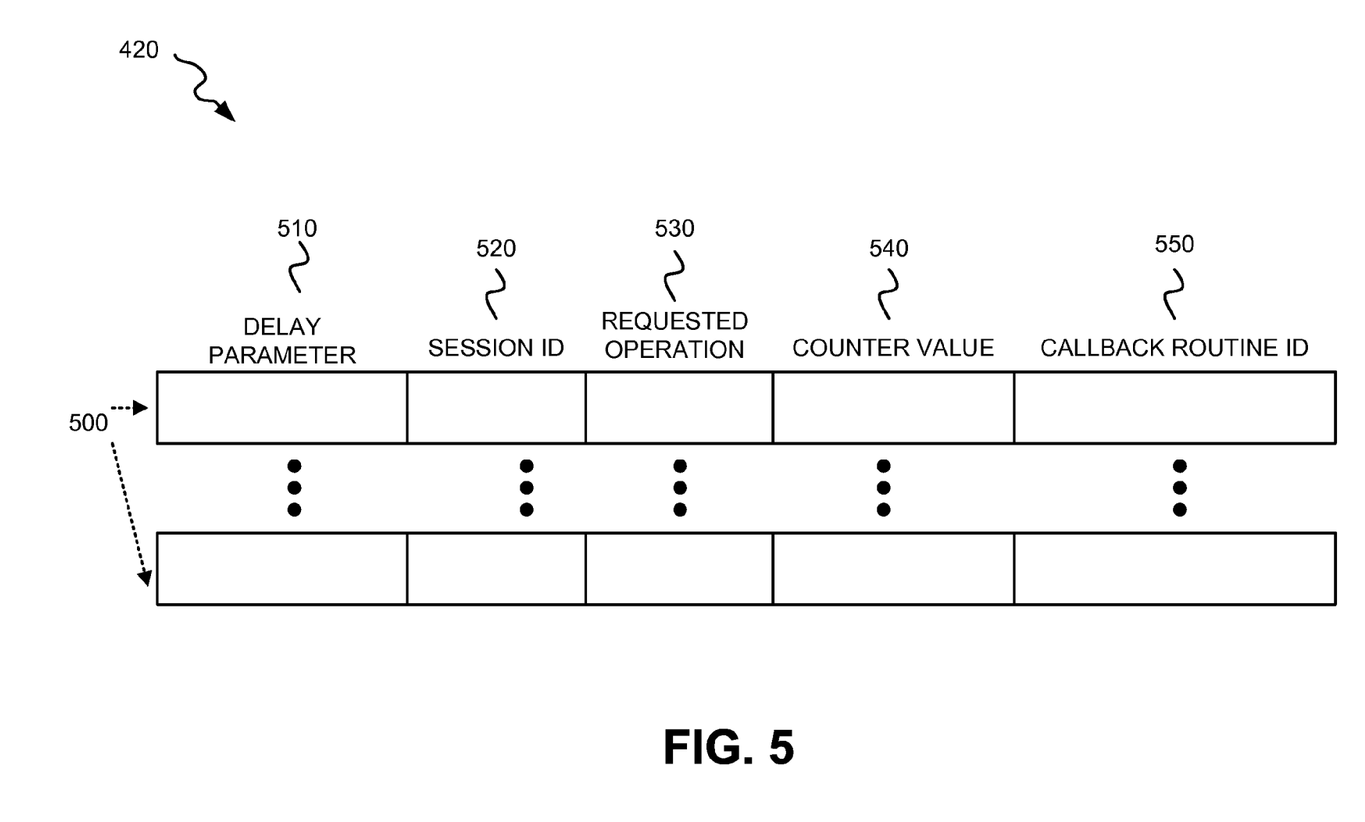
FIG. 5 is an exemplary diagram of the call context storage of FIG. 4.

FIG. 5 is an exemplary diagram of call context storage 420 of FIG. 4. Call context storage 420 may include multiple entries 500, each of which may include a delay parameter field 510, a session identifier (ID) field 520, a requested operation field 530, a counter value field 540, and a callback routine ID field 550.

Delay parameter field 510 may store a specified delay parameter received in a respective call request 140. Session ID field 520 may store the session ID assigned by call handling unit 400 for a respective call request 140. Requested operation field 530 may store an identification of an operation requested by a respective call request 140. Counter value field 540 may store a counter value that is equal to a number of units requested by a respective call request 140. For example, if call request 140 requests a number of units of 1,000 bytes, then counter value field 540 may be set equal to 1,000. Callback routine ID field 550 may store an identification of the callback routine ID that call handling unit 400 may use to return results to a respective call requester 110.

Call context storage 420 may store additional and/or different data than that shown in FIG. 5.

Exemplary Results Buffer

Figure 6:
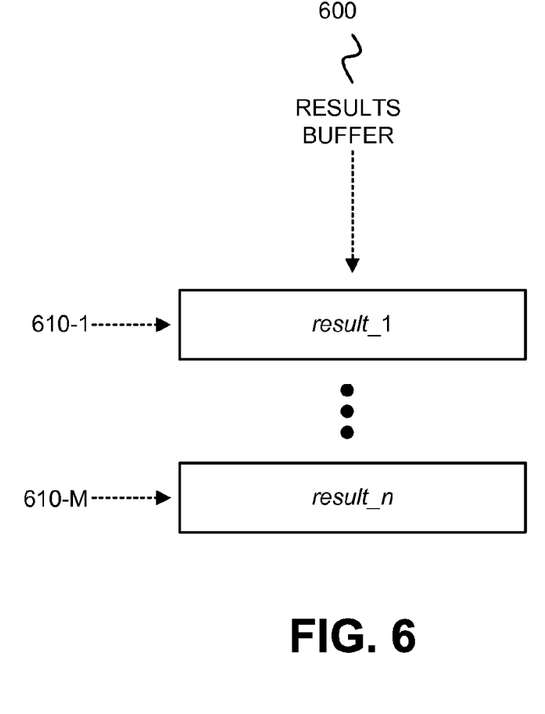
FIG. 6 is an exemplary diagram of a results buffer of the results buffers of FIG. 4.

FIG. 6 is an exemplary diagram of a single results buffer 600 of results buffers 430 of FIG. 4. Results buffer 600 may be associated with a single asynchronous call request (i.e., associated with a single session ID). Results buffers 430 of FIG. 4 may, therefore, include multiple ones of results buffer 600, one for each asynchronous call request or session ID. As shown, results buffer 430 may include multiple buffer entries 610-1 through 610-M. Each of buffer entries 610-1 through 610-M may store a result received from performance of a requested operation associated with a single asynchronous call request. Each result may include a full result that results from performance of the requested operation, or a partial result that results from performance of the requested operation.

Exemplary Call Request Handling Process

Figure 7A:
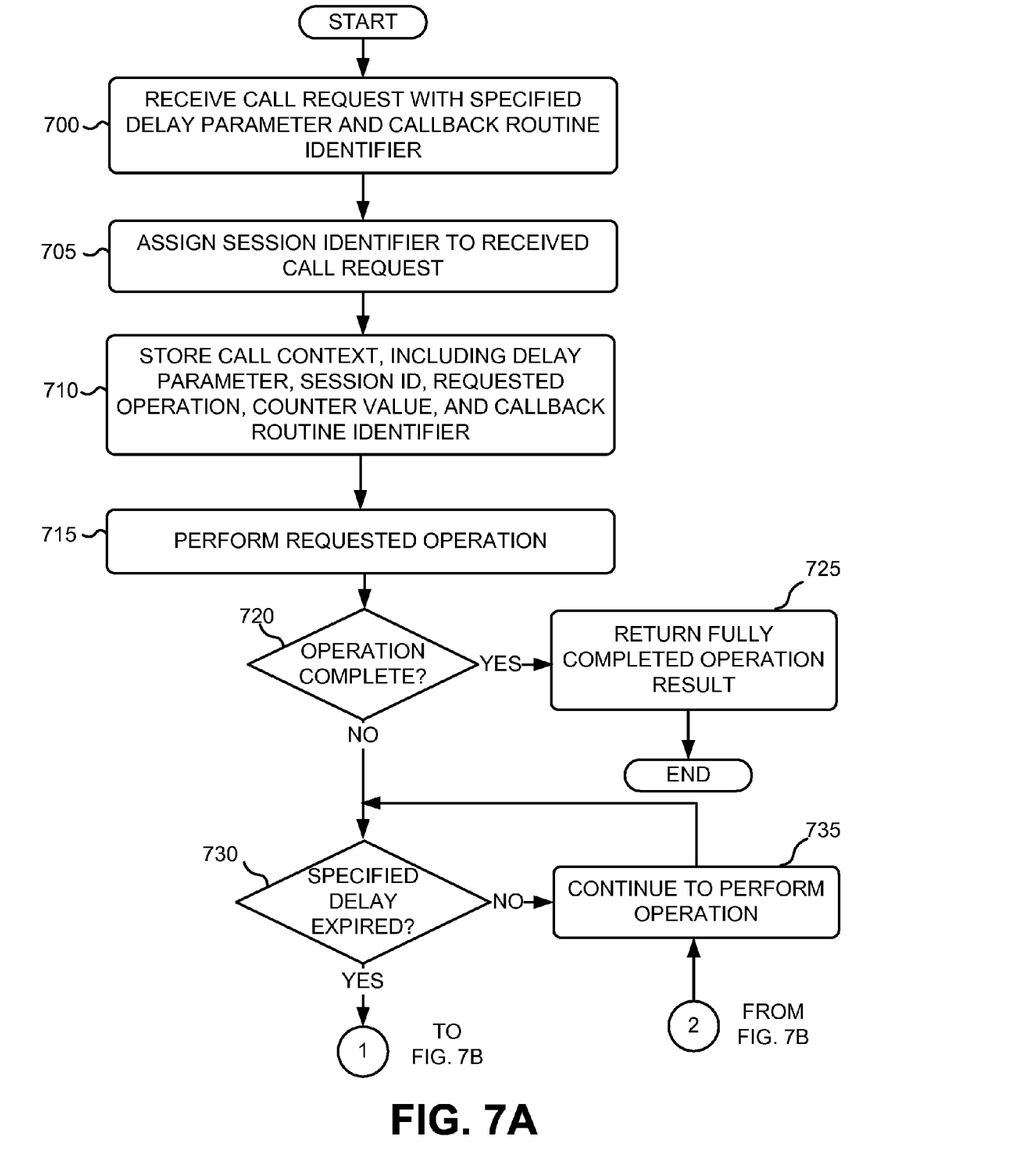
FIGS. 7A and 7B are flow charts that illustrate an exemplary process for handling asynchronous call requests using intermittent callback for delay sensitive applications.
Figure 7B:
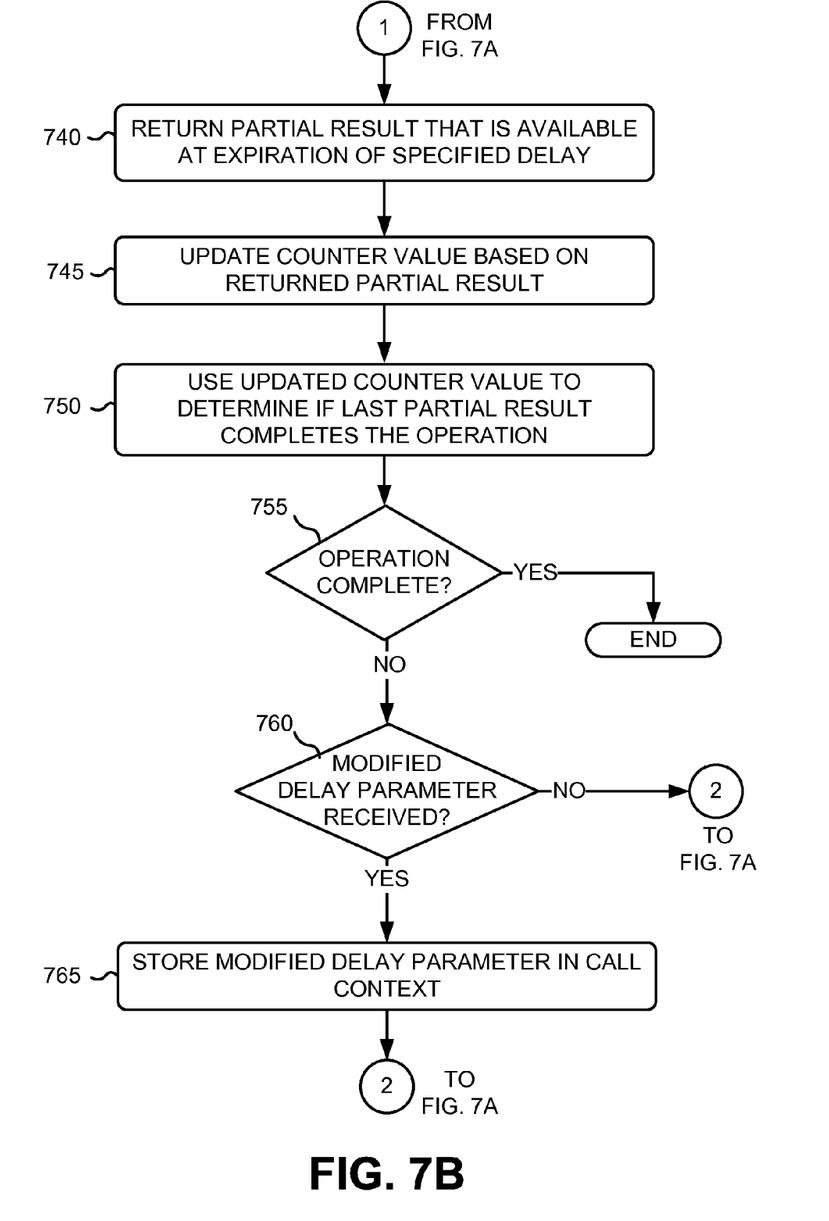

FIGS. 7A and 7B are flow charts that illustrate an exemplary process for handling asynchronous call requests using intermittent callback for delay sensitive applications. The exemplary process of FIGS. 7A and 7B may be implemented by call handling system 120. In other embodiments, some or all of the blocks described below may be performed by another entity, device, or a combination of entities or devices.

The exemplary process may include receiving a call request with a specified delay parameter and a callback routine identifier (block 700). For example, call handling system 120 may receive a call request 140 from call requester 110. Call request 140 may include, in addition to the specified delay parameter and callback routine identifier, an identifier of the operation requested by call requester 110 to be performed by call handling system 120 and a number of units requested by call requester 110. For example, if call request 140 includes a data read request, the number of units requested may be specified in a number of bytes of data to be read.

A session ID may be assigned to the received call request (block 705). Call handling unit 400 may, upon receipt of the call request, assign a unique session ID to the received call request. A call context, including the delay parameter, the session ID, operation requested, a counter value, and the callback routine ID, may be stored (block 710). The counter value may, for example, be set equal to the number of requested units that was received in call request 140. Call handling unit 400 may store the call context as an entry 500 in call context storage 420. For example, call handling unit 400 may store the specified delay parameter in delay parameter field 510, the assigned session ID in session ID field 520, the requested operation identifier in requested operation field 530, the requested number of units as a counter value in counter value field 540, and the callback routine identifier in callback routine ID field 550.

The operation requested by the received call may be performed (block 715). Call handling system 120 may, either alone or in conjunction with another entity, perform the requested operation to obtain operation results. In another embodiment, call handling system may request that another entity perform the requested operation and return the results to call handling system 120. During performance of the requested operation, partial results or complete results may be stored in results buffer 600, which corresponds to the received call request's session ID, as those results are obtained by call handling unit 400.

A determination may be made whether the requested operation has been completed (block 720). The requested operation may be determined to be completed if the number of units of the result of the performed operation is equal to the counter value stored in field 540 of entry 500 of call context storage 420.

If the requested operation has been completed (block 720-YES), call handling system 120 may return the fully completed operation result (block 725) and the exemplary process may end. Call requester 110 may "wakeup" to receive and process the fully completed operation result returned in the callback by call handling system 120. Therefore, if performance of the requested operation has returned the number of units requested by the call request then the call request has been serviced, and call handling unit 400 may send a callback to the call requester that includes the call request's session ID, the callback function pointer, and the fully completed operation result.

If the requested operation has not been completed (block 720-NO), call handling system 120 may determine if the specified delay has expired (block 730). Call handling unit 400 may receive timing information from timer 410 to determine if the difference between the time at which the call request was received (or the time of the last iteration of the specified delay interval) and a current time is greater than, or equal to, the call requester's specified delay parameter stored in field 510 of call context storage 420. If the difference is greater than, or equal to, the call requester's specified delay parameter, then the specified delay may be determined to be expired.

If the specified delay has not expired (block 730-NO), then the requested operation may continue to be performed (block 735), and the exemplary process may return to block 730. Call handling unit 400 may continue to perform the requested operation to obtain further results (e.g., partial results) until, at block 730, it is determined that the specified delay interval has expired.

If the specified delay has expired (block 730-YES), then a partial result of the requested operation, that is available at expiration of the specified delay, may be returned (block 740, FIG. 7B). Call handling unit 400 may send a callback to the call requester that includes the call request's session ID, the callback function pointer, and the partial operation result. Call requester 110 may "wakeup" to receive and process each partial result returned in an intermittent callback by call handling system 120.

The counter value may be updated based on the returned partial result (block 745). Call handling unit 400 may adjust the call request's counter value in counter value field 540 of call context storage 420 to reflect the number of units sent in the most recently returned partial operation result. For example, if counter value field 540 indicates that 500 bytes remain to be returned as a result to the call requester, and the most recently returned partial result contained 100 bytes, then counter value field 540 may be decreased to 400 bytes.

The updated counter value may be used to determine if the last returned partial result completes the requested operation (block 750). When the counter value in counter value field 540 equals zero, then the full number of units of the requested operation has been provided to the call requester, and the requested operation may be determined to be complete. If the requested operation is complete (block 755-YES), then the exemplary process may end. If the operation is not complete (block 755-NO), then a determination may be made whether a modified delay parameter has been received from the call requester (block 760). At any point during the call request handling process (e.g., during the returning of partial results), call requester 110 may change the specified delay parameter by sending a revised delay parameter to call handling system 120.

If a modified delay parameter has been received from the call requester (block 760-YES), then the modified delay parameter may be stored in the call context (block 765), and the exemplary process may continue at block 735. Upon receipt of a modified delay parameter, call handling unit 400 of system 120 may store the modified delay parameter in delay parameter field 510 of the appropriate entry 500 of call context storage 420 for future retrieval. If a modified delay parameter has not been received from the call requester (NO-block 760), then the exemplary process may continue at block 735, with further continued performance of the requested operation.

Example

Figure 8:
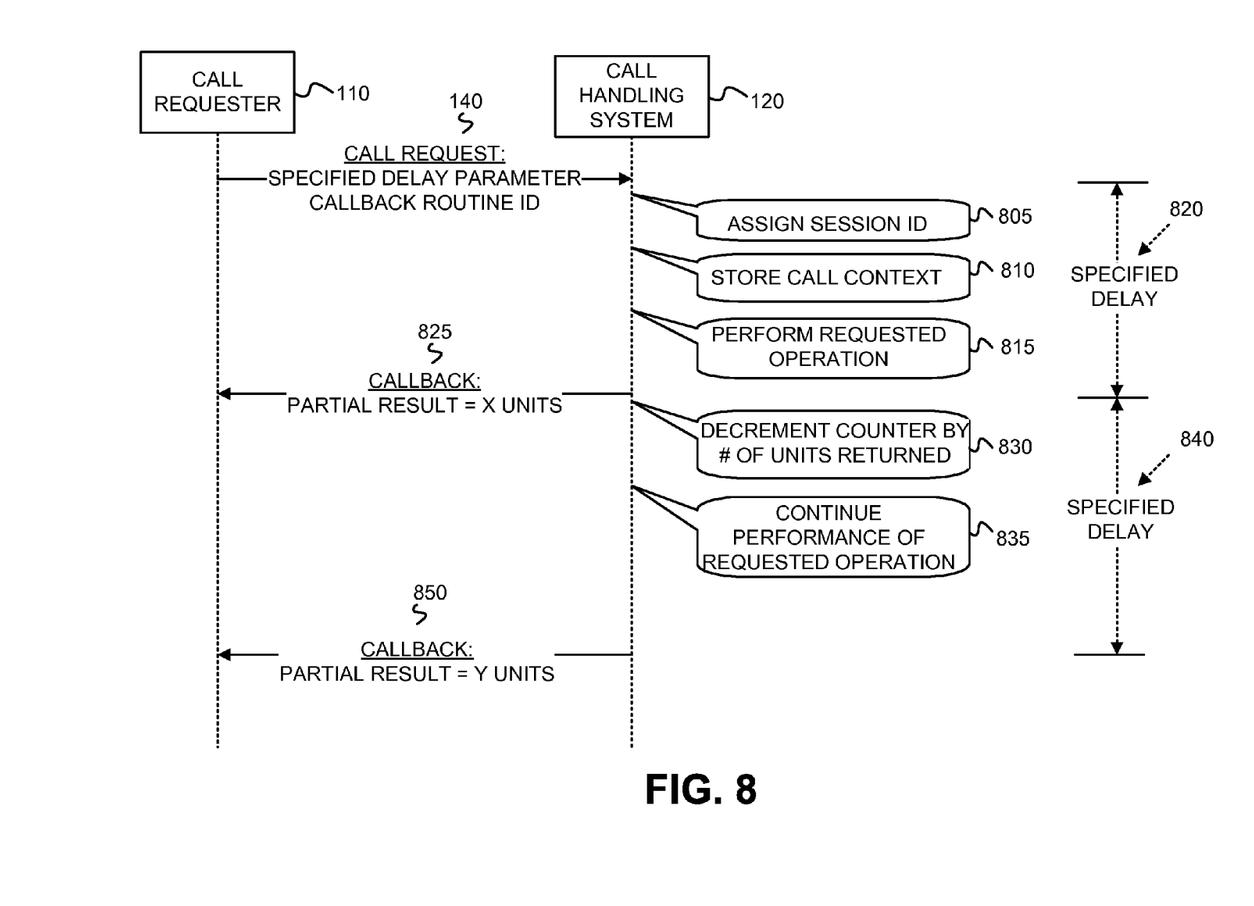
FIG. 8 is a diagram that depicts exemplary messaging associated with an example of the process of FIGS. 7A and 7B.

FIG. 8 is a diagram that depicts exemplary messaging associated with one example of the process of FIGS. 7A and 7B. As shown in FIG. 8, the call handling process in this example may begin with the issuance of call request 140 from call requester 110 to call handling system 120. Call request 140 may include a specified delay parameter, a callback routine ID, an operation requested, and a number of units requested. Upon receipt of call request 140, call handling system 120 may assign 805 a session ID, and may further store 810 the call context, that includes the assigned session ID, the specified delay parameter, the requested operation, the number of units requested, and the callback routine ID, in an appropriate entry 500 of call context storage 420. Call handling system 120 may proceed to perform 815 the requested operation and store on-going results obtained from the performed operation in an appropriate results buffer 600. Upon expiration of the delay 820 specified in call request 140, call handling system 120 may retrieve the call's results from results buffer 600 and may send a callback 825, which includes a partial result of X units, to call requester 110. Call handling system 120 may decrement 830 the call request's counter value stored in counter value field 540 of call context storage 420 by the X units returned to call request 110 in callback 825. Call handling system 400 may continue 835 to perform the requested operation until a second expiration 840 of the delay specified in call request 140. Upon the second expiration 840 of the delay specified in call request 140, call handling system 120 may retrieve the call's results from results buffer 600 and may send a callback 850, which includes a partial result of Y units, to call requester 110. Though not shown in FIG. 8, the counter may continue to be decremented 830, the performance may continue to be performed 835, and more callbacks (e.g., similar to callback 850) may continue to be sent to call requester 110 at intermittent intervals determined by expiration of a specified delay 840, until the full results of the requested operation are returned to call requester 110.

CONCLUSION

As described herein, an asynchronous call handling process may use intermittent callbacks for returning partial results to delay sensitive call requesters who request the performance of an operation by a call handling system. The intermittent callbacks may be based on a specified delay parameter, received in the call request, which indicates the call requester's tolerance for delay in receiving results from a requested operation. The call handling system may use the specified delay parameter to set an interval for an intermittent callback, which returns partial results of the requested operation, to the call requester. During the intermittent callback, the call handling system may return any complete results that have resulted from performance of the requested operation, or any partial results that have resulted from performance of the requested operation, at the expiration of a time period that equals the specified delay parameter. Thus, at each intermittent callback determined by the specified delay parameter, the call handling system may return a partial result, which results from performance of the requested operation, to the call requester.

Embodiments described herein, therefore, permit call requesters (e.g., user programs or applications) to be notified intermittently in case of delays in the call handling system (e.g., operating system or Kernel). Call requesters, by use of the intermittent callbacks described herein, may need to only make one asynchronous call to receive multiple callbacks from the call handling system, thereby reducing a number of context switches compared to using multiple asynchronous calls from the call requester. Intermittent callback, as described herein, may also reduce the queue (e.g., a Kernel queue) required to queue received call requests by the call handling system. Intermittent callback based on a delay specified by the call requester (i.e., either in the call request, or via a subsequent delay modification request, enables call requesters (e.g., applications or user programs) to reduce or increase delay based on the call handling system's response time, or based on the dynamic needs of the call requesters. Intermittent callback based on a specified delay further allows the call requesters to be more deterministic in terms of Input/Output (I/O) operations.

The foregoing description of embodiments described herein provides illustration and description, but is not intended to be exhaustive or to limit the embodiments described herein to the precise form disclosed. Modifications and variations are possible in light of the above teachings or may be acquired from practice of the invention.

While series of blocks have been described in FIGS. 7A and 7B, the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method comprising:
   receiving, by a first device, an asynchronous call request, from a second device, requesting performance of an operation, the call request including a delay parameter specified by the second device, the delay parameter including a first value;
   performing, by the first device, the requested operation for a period of time associated with the first value;
   determining, by the first device, whether the first value has expired;
   sending, by the first device and to the second device when the first value has expired, a callback that includes partial results from performance of the requested operation;
   determining, by the first device, whether the partial results complete the operation;
   determining, by the first device and when the partial results do not complete the operation, if a modified delay parameter has been received, the modified delay parameter including a second value; and
   performing, by the first device, the requested operation for another period of time associated with the second value.

2. The method of claim 1, where the call includes a unit request, associated with the performance of the requested operation, which specifies a number of units requested in complete results for the requested operation.

3. The method of claim 2, further comprising:
   setting a counter value equal to a value of the unit request; and
   decrementing the counter value based on the partial results included in the callback.

4. The method of claim 3, where sending the callback further comprises:
   determining whether to send the callback based on the counter value.

5. The method of claim 1, further comprising:
   associating a session identifier with the asynchronous call request to identify the call request and the partials results.

6. The method of claim 1, further comprising:
   sending the callback including the partial results to the second device at one or more particular intervals.

7. The method of claim 1, where the delay parameter defines a tolerance for delay in receiving results of the asynchronous call request.

8. The method of claim 1, further comprising:
   altering, based on the modified delay parameter, one or more particular intervals for transmitting one or more results of the requested operation.

9. The method of claim 1, where the second device includes an application and the first device includes an operating system.

10. The method of claim 1, where the call request includes a callback routine identifier used for sending the callback to the second device.

11. The method of claim 10, where the callback includes the callback routine identifier for returning the partial results to the second device.

12. A call handling system, comprising:
    a call handling unit to:

receive an asynchronous call request, from a call requester, requesting performance of an operation, the call request including a delay parameter specified by the call requester, the delay parameter including a first value, perform the requested operation for a period of time associated with the first value, obtain timing information from a timer, determine, based on the timing information, an expiration of a first interval that corresponds to the delay parameter, send, when the first interval has expired, a first callback to the call requester, the first callback including a first partial result from performance of the requested operation, determine, based on the timing information, an expiration of a second interval that corresponds to the delay parameter, send, when the second interval has expired, a second callback to the call requester, the second callback including a second partial result from performance of the requested operation, determine whether the second partial result completes the operation;

determine, when the second partial result does not complete the operation, if a modified delay parameter has been received, the modified delay parameter including a second value; and perform the requested operation for another period of time associated with the second value.

13. The system of claim 12, where the call request includes a unit request, associated with the performance of the operation, which specifies a number of units requested.

14. The system of claim 13, where the call handling unit is further to:
set a counter value equal to a value of the unit request.

15. The system of claim 14, where the call handling unit is further to:
determine whether to send the first callback based on the counter value.

16. The system of claim 12, where the call handling unit is further to:
associate a session identifier with the asynchronous call request to identify the call request, the first partial result, and second partial result.

17. The system of claim 12, where the call handling unit is further to:
determine, based on the timing information, an expiration of a third interval that corresponds to the delay parameter, and
send a third callback to the call requester, which includes a third partial result from performance of the requested operation, based on the expiration of the third interval.

18. The system of claim 12, where the delay parameter defines a tolerance for delay in the asynchronous call request.

19. The system of claim 12, where the call handling unit is further to:
alter, based on the modified delay parameter, one or more particular intervals for transmitting one or more results of the requested operation.

20. A call handling system, comprising:
a device to:
receive an asynchronous call request, from a call requester, requesting performance of an operation, the call request including a delay parameter, specified by the call requester, the delay parameter including a first value;
perform the requested operation for a period of time associated with the first value;
send, when the first value has expired, a callback to the call requester, that includes partial results from performance of the requested operation;
determine whether the partial results complete the operation;
determine, when the partial results do not complete the operation, if a modified delay parameter has been received, the modified delay parameter including a second value; and
perform the requested operation for another period of time associated with the second value.

* * * * *